United States Patent
Saxena et al.

(10) Patent No.: US 7,103,730 B2
(45) Date of Patent: Sep. 5, 2006

(54) METHOD, SYSTEM, AND APPARATUS FOR REDUCING POWER CONSUMPTION OF A MEMORY

(75) Inventors: Alankar Saxena, Folsom, CA (US); Aditya Sreenivas, Eldorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 10/119,864

(22) Filed: Apr. 9, 2002

(65) Prior Publication Data

US 2003/0191915 A1 Oct. 9, 2003

(51) Int. Cl.
*G06F 12/00* (2006.01)
*G06F 1/32* (2006.01)

(52) U.S. Cl. .................. 711/156; 711/105; 711/160; 713/320; 713/323

(58) Field of Classification Search ............... 711/133, 711/136, 160, 130, 134, 159; 713/320, 323; 365/227, 229

See application file for complete search history.

(56) References Cited

U.S. PATENT DOCUMENTS

| | | | |
|---|---|---|---|
| 6,327,664 B1 * | 12/2001 | Dell et al. .................. 713/323 |
| 6,356,500 B1 * | 3/2002 | Cloud et al. ................ 365/226 |
| 6,442,698 B1 * | 8/2002 | Nizar ......................... 713/320 |
| 6,496,440 B1 * | 12/2002 | Manning ............... 365/230.03 |
| 6,526,471 B1 * | 2/2003 | Shimomura et al. ........... 711/5 |

* cited by examiner

*Primary Examiner*—Reginald G. Bragdon
*Assistant Examiner*—Shawn Gu
(74) *Attorney, Agent, or Firm*—Michael J. Nesheiwat

(57) ABSTRACT

A method, system, and apparatus to reduce power consumption of a memory by actively asserting the CKE pin based at least in part on a LRU status of the rows in an active mode.

26 Claims, 5 Drawing Sheets

METHOD, SYSTEM, AND APPARATUS FOR REDUCING POWER CONSUMPTION OF A MEMORY

The present invention relates to reducing power consumption of a memory.

DESCRIPTION OF THE RELATED ART

A Dynamic Random Access Memory, DRAM, is a typical memory to store information for computers and computing systems, such as, personal digital assistants and cellular phones. DRAMs contain a memory cell array having a plurality of individual memory cells; each memory cell is coupled to one of a plurality of sense amplifiers, bit lines, and word lines. The memory cell array is arranged as a matrix of rows and columns, and the matrix is further subdivided into a number of banks.

The DRAM memory cell consists of a single transistor and a single capacitor and is dynamic because charge stored on the capacitor decays because of a various leakage current paths to surrounding cells and to the substrate. Typically, a refresh operation is performed on the DRAM memory cell to ensure the validity of the data. For example, the refresh operation is initiated by a memory controller to read the data from the cell array via the sense amplifiers and subsequently rewriting the data back into the cell array. Thus, the refresh operation restores the capacitor's charge to ensure the validity of the data.

One type of DRAM is a synchronous dynamic random access memory (SDRAM) that allows for synchronous operation with a processor. Specific types of SDRAM are a single data rate (SDR) SDRAM and a double data rate (DDR) SDRAM. The SDR SDRAM receives a single bit of data, in each bit of the databus, for each system clock pulse, typically, on either the rising or falling edge of the system clock pulse. In contrast, DDR SDRAM receives two bits of data, in each bit of the databus, for each system clock pulse, typically, one bit on the rising and one bit on the falling edge of the system clock pulse.

Typically, SDR and DDR DRAMs operate in an active mode to receive addresses to access the memory. In contrast, they also operate in a low power mode based on activation of an input pin, clock enable (CKE). When this pin is active or asserted, the memory is operating in the active mode and consuming normal levels of power. In contrast, when this pin is inactive or de-asserted, the memory will "power down" the row by disabling the input buffers and clock inputs resulting in the memory operating in a low power mode and reducing the memory's power consumption. However, the low power mode activated by CKE is only enabled when the processor or system is also in a low power mode. Thus, reducing the memory's power consumption only occurs when the system or processor is also in a low power mode.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION OF THE INVENTION

A system, apparatus, and method for reducing power consumption of a memory are described. In the following description, for purposes of explanation, numerous details are set forth in order to provide a thorough understanding of the present invention. However, it will be apparent to one skilled in the art that these specific details are not required in order to practice the present invention.

An area of current technological development relates to achieving longer battery life for communication products and computer or computing systems by reducing power consumption. As previously described, reducing the memory's power consumption only occurs when the system or processor is also in a low power mode. In contrast, a method, apparatus, and system that incorporates a memory controller dynamically asserting the low power mode of the memory based at least in part on the pattern of accesses to the memory, rather than only when the system or processor is in low power mode, results in reduced power consumption of the memory.

In one aspect, the claimed subject matter asserts a power down to allow for a low power mode of the memory based at least in part on a counter to track an idle status of a memory's row. In another aspect, the claimed subject matter asserts a power down to allow for a low power mode of the memory based at least in part on a least recently used status of a memory row and a predefined number of active memory rows. In yet another aspect, the claimed subject asserts a power down to allow for a low power mode of the memory based on at least in part on both the counter to track the idle status of a memory row and the least recently used status of a memory row. In still yet another aspect, the claimed subject asserts a low power mode of the memory based on at least in part on either pre-charging all the memory's pages that are in an open status of the row that will imminently enter a low power mode, but before de-asserting a clock enable (CKE ) pin, referred to as a pre-charge power down, or leaving the memory's pages in an open status before de-asserting the CKE pin. (hereinafter, referred to as a active power down).

Figure 1:
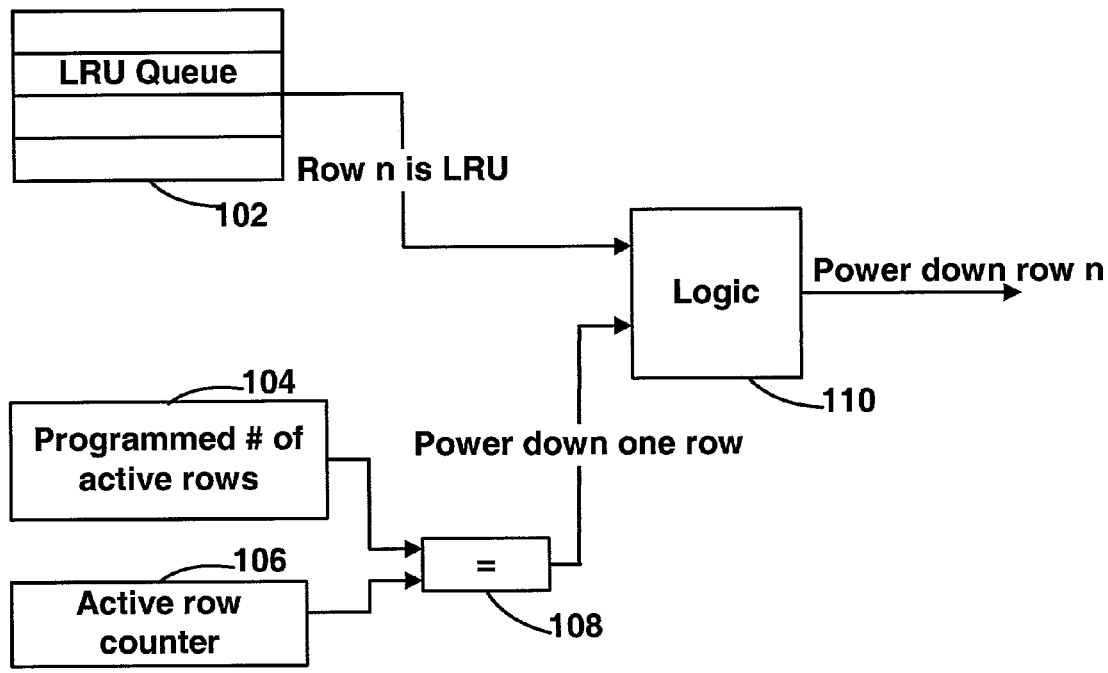
FIG. 1 is a schematic diagram in accordance with one embodiment.

FIG. 1 is a schematic diagram in accordance with one embodiment. In one embodiment, the schematic 100 includes, but is not limited to, a queue 102, a register 104, a counter 106, a comparator 108, and a logic 110. In one embodiment, the schematic is integrated within a memory controller. In another embodiment, the schematic 100 is integrated within a memory controller hub (MCH). In another embodiment, the schematic 100 is integrated within a graphics memory controller hub (GMCH). However, the claimed subject matter for the schematic is not limited to a memory controller, MCH, or GMCH. For example, the schematic may be a integrated into a chipset, or integrated within a processor, or a portion of an application specific integrated circuit (ASIC).

In one embodiment, the register 104 stores a value to determine an allowable number of the memory's rows that are simultaneously in an active mode. In this embodiment, the register is two bits and allows for a value ranging between one and four. However, the claimed subject matter is not limited to having a value between one and four. For example, the register may store a value that is greater than four by utilizing more than two bits. In one embodiment, the register 104 may be programmed.

In one embodiment, the counter 106 stores the actual number of the memory's rows that are in a normal operating mode, commonly referred to as "active mode". The value of the allowable number of rows that are in active mode from register 104 and the actual number of rows in the active mode from counter 106 are forwarded to a comparator 108. Based on the values, the comparator 108 determines if an access to the memory device will result in the number of rows in the active mode exceeding the allowable number of rows that are in the active mode. If so, the comparator 108 activates a signal "Power down one row" to the logic 110. In one embodiment, the Power down one row is to prevent the actual number of rows in active mode from exceeding the value of allowable rows to be in active mode stored in register 104. Thus, the logic 110 needs to select a row to power down, which will result in the selected row to be powered down and operates in a low power mode. In one embodiment, the logic 110 deactivates a clock enable (CKE) pin of the memory device to initiate a low power mode for the memory device.

The queue 102 stores a least recently used status for each of the active rows of the memory. In one embodiment, when there is a need to power down a row, the queue forwards the value of the row that has not been accessed for the longest time, "least recently used status", to the logic 110. Thus, when the Power down one row signal is active, the logic 110 generates a signal to power down a row based at least in part on the least recently used status stored in queue 102.

In another embodiment, when there is a need to power down a row, the logic 110 requests and searches the queue 102 to determine the active row that has not been accessed for the longest time (least recently used status). As a result of the search, the row which has been least recently used based at least in part on the least recently used status stored in the queue, will be forwarded to the logic 110. Thus, when the Power down one row signal is active, the logic 110 generates a signal to power down a row based at least in part on the least recently used status stored in queue 102. Subsequently, the row to be powered down will operate in a low power mode. In one embodiment, the logic 110 de-activates a clock enable (CKE) pin of the memory device to initiate a low power mode for the memory device.

In one embodiment, the logic 110 generates a request to power down a row and forwards the request to a memory controller. In another embodiment, the logic 110 generates a request to power down a row and forwards the request to a memory controller hub (MCH). In yet another embodiment, the logic 110 generates a request to power down a row and forwards the request to a graphics memory controller hub (GMCH). In still another embodiment, the logic 110 generates a request to power down a row and forwards the request to a processor. In another embodiment, the logic 110 is integrated within a memory controller, which de-activates a clock enable (CKE) pin of the memory device to initiate a low power mode for the memory device.

In one embodiment, all of the memory device's rows are forced to operate in a normal mode, an active mode, if the memory device needs to perform a refresh operation. Upon completion of the refresh operation, all the memory device's rows are transferred back to a low power mode.

Figure 2:
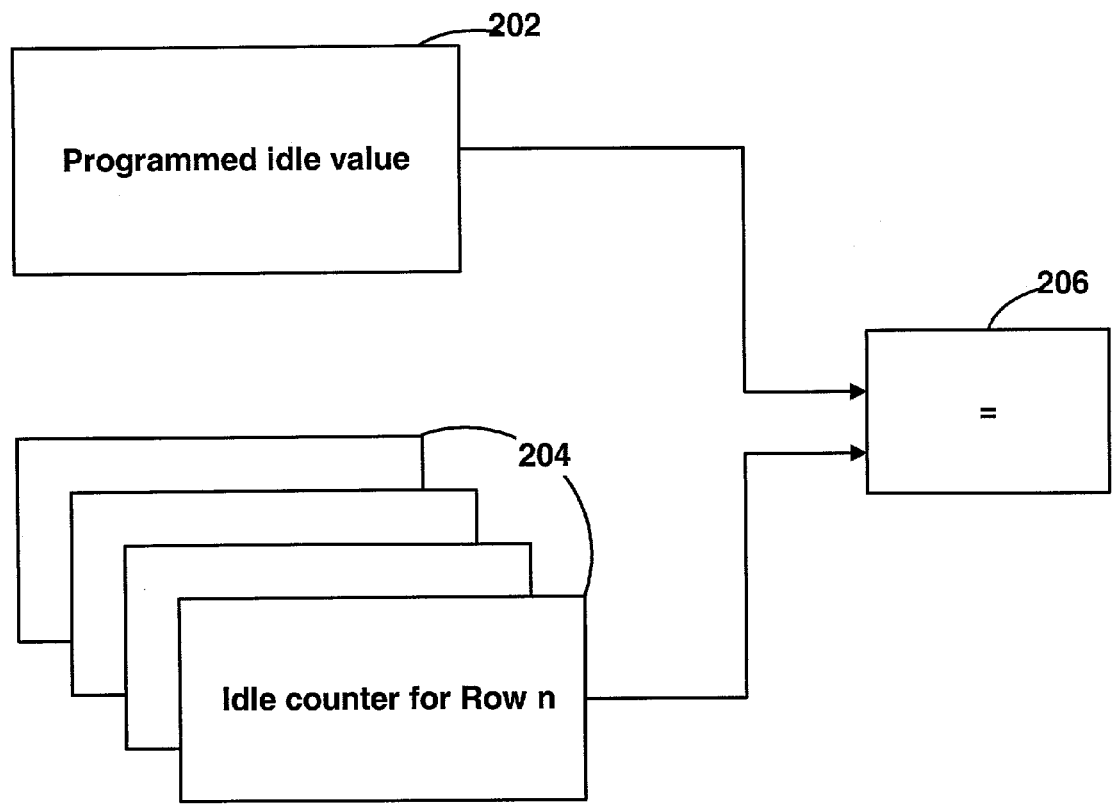
FIG. 2 is a schematic diagram in accordance with one embodiment.

FIG. 2 is a schematic diagram in accordance with one embodiment. In one embodiment, the schematic 200 includes, but is not limited to, a register 202, a plurality of counters 204, and a comparator 206. The register 202 stores a threshold value to represent a number of memory clock cycles. For example, in one embodiment, the register 202 stores a value of eight. If a row has been idle for at least eight memory clock cycles, the row's operating mode is changed from a normal operating mode, active mode, to a low power mode. However, the claimed subject matter is not limited to a value of eight. For example, in different embodiments, the value may be sixteen, sixty four, 1024, etc. Also, the value may is dynamic and may be reprogrammed. For example, the value may be initially set at a threshold of eight. Subsequently, the value may be reset to a different value because of different circumstances that reflect a need to save power, thus setting the value at a lower less than eight. In contrast, if the circumstances reflect a need to increase the number of rows to operate in an active mode, the value may be increased to a higher value than eight.

The plurality of counters 204 store a counter value for a subset of rows. The counter value represents the number of cycles that respective row has not received a read or write access, referred to as being "idle". The comparator 206 receives the value stored in 202 and the counter value for the subset of rows in the plurality of counters 204. If one of the counter values for a row is at least equivalent to or exceeds the value in register 202, the comparator generates a request to power down the respective row. Thus, the row to be powered down will be transferred from an active mode to a low power mode.

In one embodiment, all of the memory device's rows are transferred to a normal mode, an active mode, when the memory device needs to perform a refresh operation. Upon completion of the refresh operation, all the memory device's rows are transferred back to a low power mode.

Figure 3:
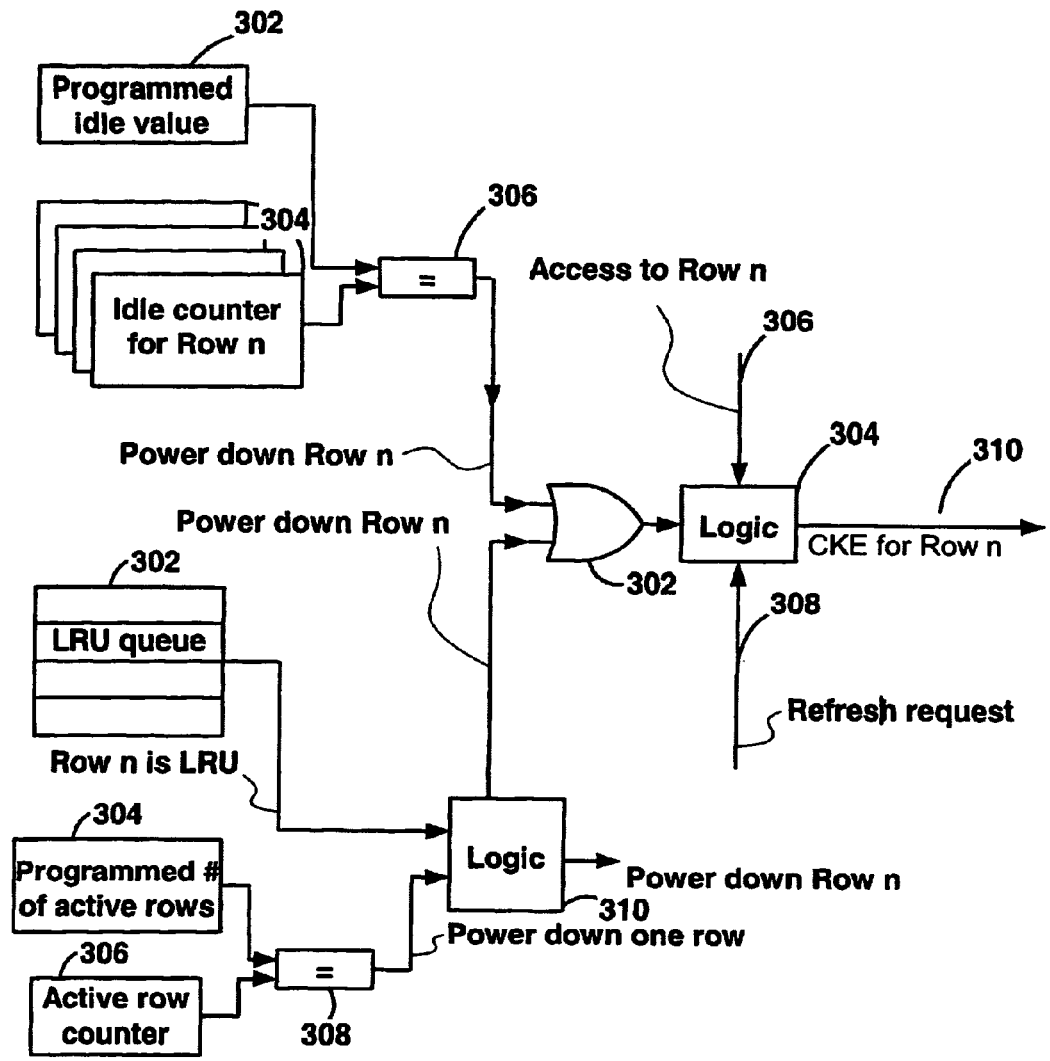
FIG. 3 is a schematic diagram in accordance with one embodiment.

FIG. 3 is a schematic diagram in accordance with one embodiment. In one embodiment, the schematic 300 includes, but is not limited to, a queue 302, a register 304, a counter 306, a comparator 308, a first logic 310, a register 312, a plurality of counters 314, a comparator 316, an OR gate 318, and a second logic 320. In one embodiment, the queue 302, the register 304, the counter 306, the comparator 308, and the first logic 310 operate in a similar manner as described in connection with FIG. 1. In the same embodiment, the register 312, the plurality of counters 314, and the comparator 316 operate in a similar manner as described in connection with FIG. 2.

Figure 4:
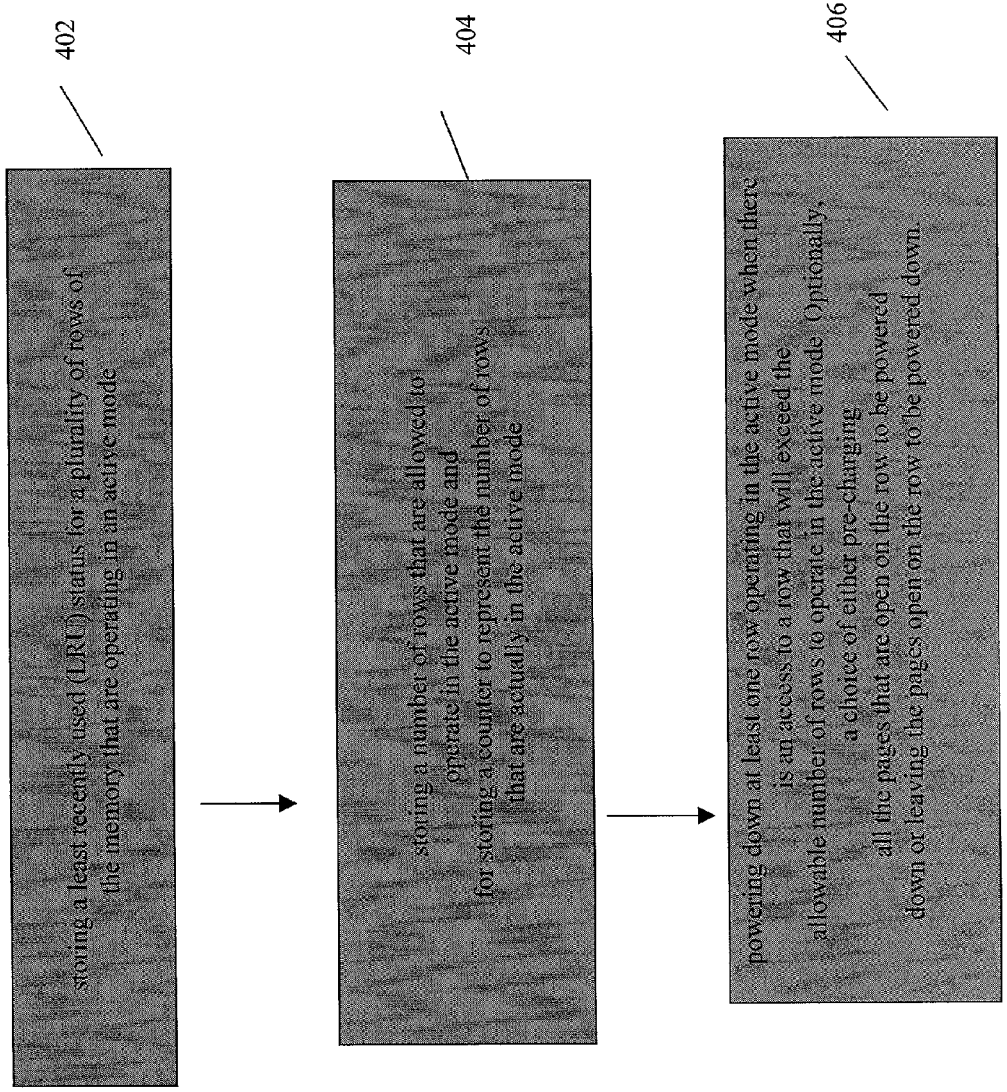
FIG. 4 is a method in accordance with one embodiment.

FIG. 4 is a method in accordance with one embodiment. In one embodiment, the method represents a scheme to power down a row in an active mode based at least in part on a least recently used status of the row. The method includes, but is not limited to, the following blocks 402, 404, 406. The block 402 is for storing a least recently used (LRU) status for a plurality of rows of the memory that are operating in an active mode. Block 404 is for storing a number of rows that are allowed to operate in the active mode and for storing a counter to represent the number of rows that are actually in the active mode. Block 406 is for powering down at least one row operating in the active mode when there is an access to a row that will exceed the allowable number of rows to operate in the active mode. The row to be powered down is based at least in part on the LRU status of the rows operating in the active mode. Optionally, the method allows for a choice of either pre-charging all the pages that are open on the row to be powered down or leaving the pages open on the row to be powered down.

Figure 5:
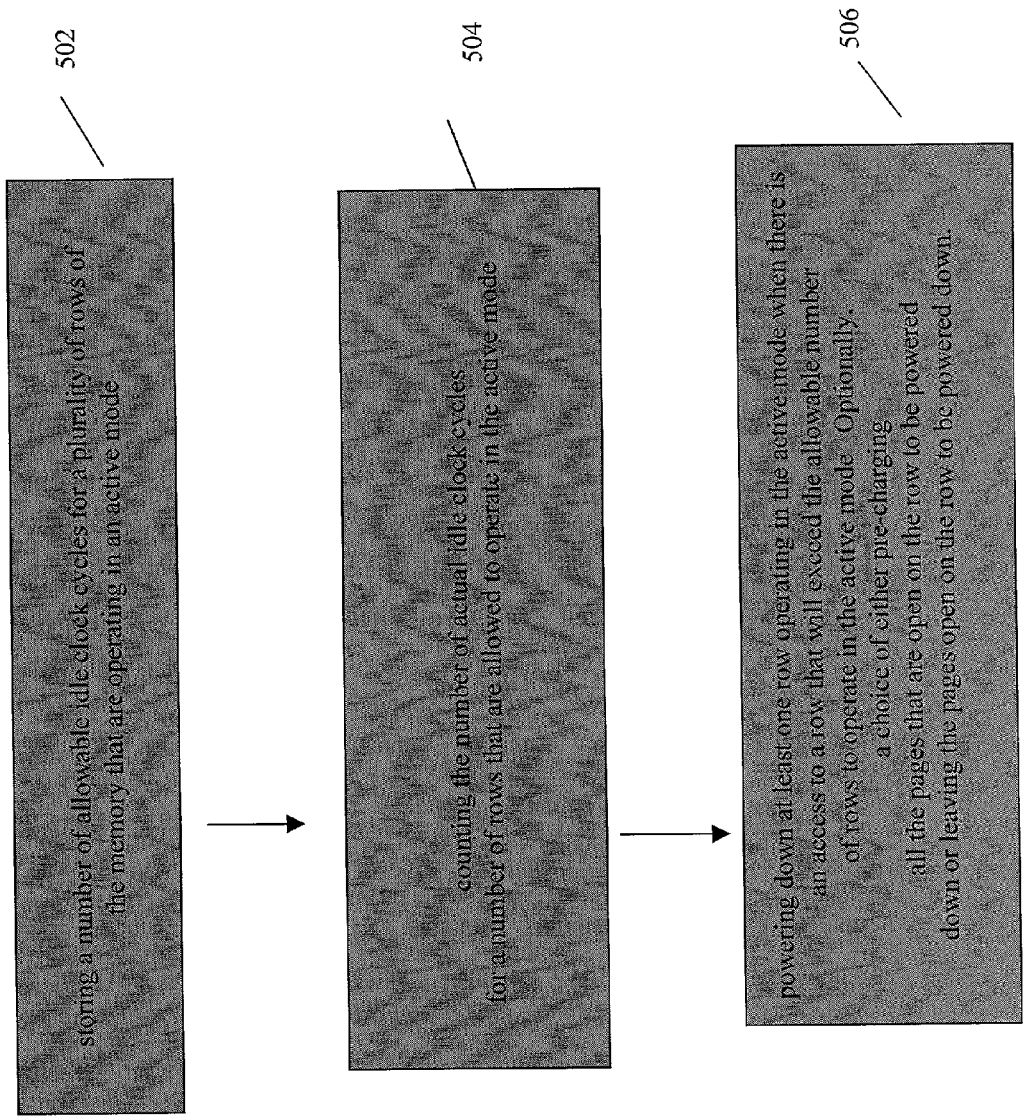
FIG. 5 is a method in accordance with one embodiment.

FIG. 5 is a method in accordance with one embodiment. In one embodiment, the method represents a scheme to power down a row in an active mode based at least in part on a counter that indicates a number of idle clock cycles of the row. The method includes, but is not limited to, the following blocks 502, 504, 506. The block 502 is for storing a number of allowable idle clock cycles for a plurality of rows of the memory that are operating in an active mode. In one embodiment, the allowable number of idle clock cycles is 8, 16, 64, or 1024. Block 504 is for counting the number of actual idle clock cycles for a number of rows that are allowed to operate in the active mode. Block 506 is for powering down at least one row operating in the active mode when there is an access to a row that will exceed the allowable number of rows to operate in the active mode. The row to be powered down is based at least in part on the number of actual idle clock cycles of the rows operating in the active mode. Optionally, the method allows for a choice of either pre-charging all the pages that are open on the row to be powered down or leaving the pages open on the row to be powered down.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

What is claimed is:

1. A method to control a memory with a plurality of rows comprising:
    storing a least recently used (LRU) status for at least one of the plurality of rows that are in an active mode;
    storing a number, the number to determine the number of rows to be allowed to be in the active mode;
    counting the number of rows that are actually operating in the active mode; and
    powering down at least one row that operates in the active mode based at least in part on the LRU status of the row.

2. The method of claim 1 wherein the powering down comprises:
    exceeding the number of rows to be allowed to be in the active mode; and
    replacing the row that is least recently used based at least in part on the LRU status.

3. The method of claim 1 wherein the number of rows to be allowed to be in the active mode is four.

4. The method of claim 1 wherein the powering down comprises asserting a clock enable (CKE) pin of the memory.

5. The method of claim 1 further comprising bypassing the powering down the row when the memory receives a refresh request.

6. The method of claim 5 wherein the powering down the row comprises powering down all the rows of the memory at the completion of the refresh request.

7. The method of claim 1 wherein the powering down comprises either:
    pre-charging a plurality of pages of the memory that are open on the row to be powered down or leaving the pages open.

8. The method of claim 1 wherein the memory is a Single Data Rate (SDR) dynamic random access memory (SDR DRAM).

9. The method of claim 1 wherein the memory is a Dual Data Rate (DDR) dynamic random access memory (DDR DRAM).

10. An apparatus, coupled to at least one memory device with a plurality of rows, comprising:
    a queue, coupled to at least one memory device, to store a least recently used (LRU) status for at least one row that operates in an active mode;
    a comparator, coupled to the queue, to compare a number of rows that are in the active mode to a number of rows that are allowed to be in the active mode; and
    a logic, coupled to the queue, to power down at least one row operating in the active mode based at least in part on a result of the comparator and the LRU status of the row(s) in the active mode.

11. The apparatus of claim 10, wherein the results of the comparator is to indicate the number of rows operating in the active mode exceeds the number of rows that are allowed to be in the active mode.

12. The apparatus of claim 10 wherein the logic is to select the row to power down based at least in part on the row being the least recently used according to the LRU status.

13. The apparatus of claim 10 wherein the number of rows that are allowed to operate in the active mode is four.

14. The apparatus of claim 10 wherein the memory device is a memory is a Single Data Rate (SDR) dynamic random access memory (SDR DRAM).

15. The apparatus of claim 10 wherein the memory device is a Dual Data Rate (DDR) dynamic random access memory (DDR DRAM).

16. The apparatus of claim 10 wherein the apparatus is a memory controller.

17. The apparatus of claim 10 wherein the apparatus is a memory controller hub (MCH).

18. The apparatus of claim 10 wherein the apparatus is a graphics memory controller hub (GMCH).

19. The apparatus of claim 10 wherein the logic is to assert a clock enable pin (CKE) of the memory device.

20. An apparatus, coupled to at least one memory device with a plurality of rows, comprising:
    a queue to store a least recently used (LRU) status for at least one row that operates in an active mode;
    a comparator, coupled to the queue, to compare a number of rows that are in the active mode to a number of rows that are allowed to be in the active mode; and
    a register, coupled to the queue, to store a value to indicate an allowable number of idle clock cycles for at least one of the plurality of rows;
    a plurality of counters, coupled to the queue, one counter for each row operating in an active mode to count a number of idle clock cycles; and
    a logic to power down at least one row operating in the active mode based at least in part on: the LRU status of the row and a result of the comparator.

21. The apparatus of claim 20 wherein the memory device is a memory is a Single Data Rate (SDR) dynamic random access memory (SDR DRAM).

22. The apparatus of claim 20 wherein the memory device is a Dual Data Rate (DDR) dynamic random access memory (DDR DRAM).

23. The apparatus of claim 20 wherein the apparatus is a memory controller.

24. The apparatus of claim 20 wherein the apparatus is a memory controller hub (MCH).

25. The apparatus of claim 20 wherein the apparatus is a graphics memory controller hub (GMCH).

26. The apparatus of claim 20 wherein the logic, to power down at least one row, is to assert a clock enable pin (CKE) of the memory device to power.

* * * * *